N. M. LA PORTE.
CIRCULATION CONTROL.
APPLICATION FILED AUG. 10, 1915.

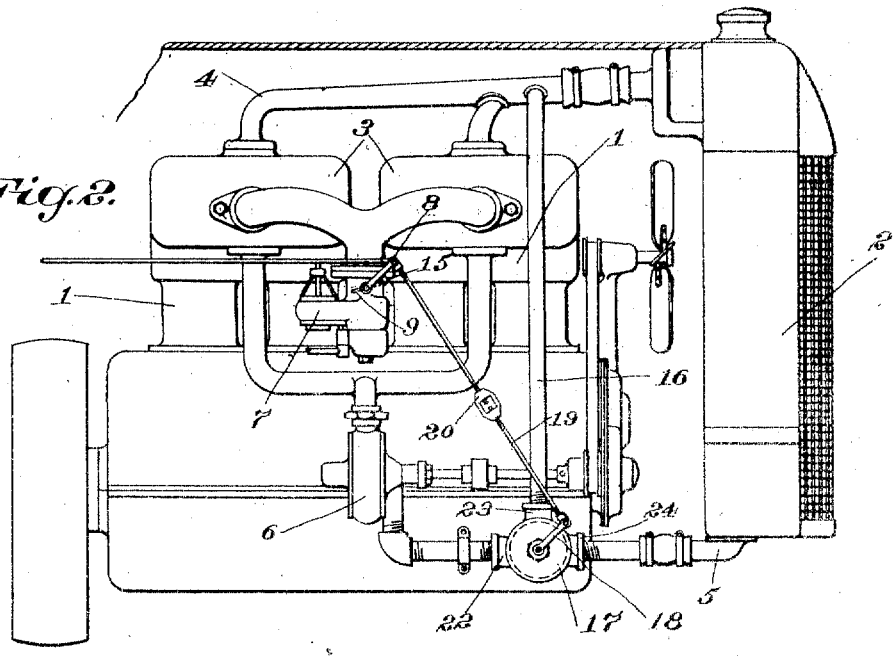
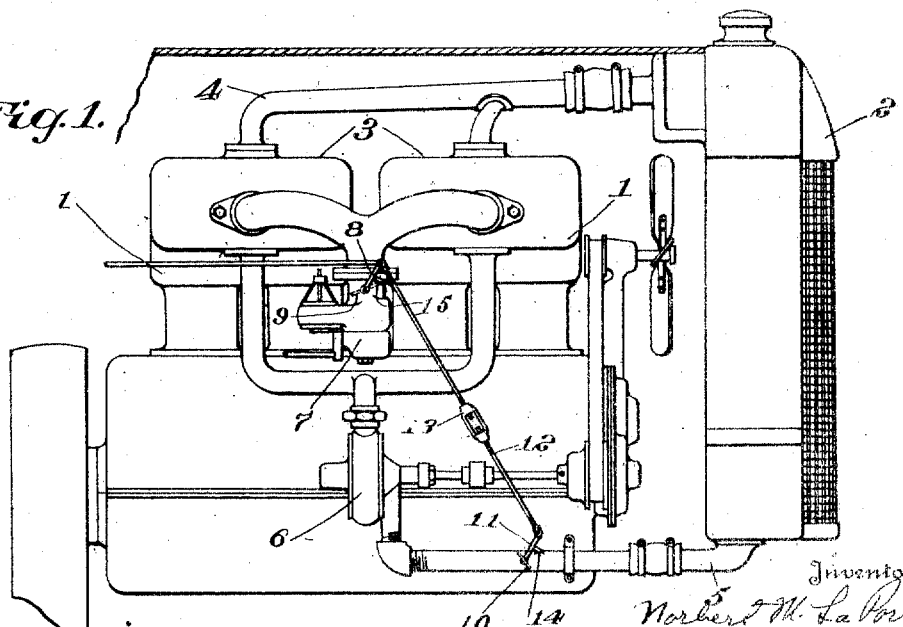

1,253,695.

Patented Jan. 15, 1918.
2 SHEETS—SHEET 2.

UNITED STATES PATENT OFFICE.

NORBERT M. LA PORTE, OF BALTIMORE, MARYLAND, ASSIGNOR, BY MESNE ASSIGNMENTS, TO THE MOTOR COOLING SYSTEMS COMPANY, A CORPORATION OF DELAWARE.

CIRCULATION CONTROL.

1,253,695.      Specification of Letters Patent.      Patented Jan. 15, 1918.

Application filed August 10, 1915. Serial No. 44,672.

*To all whom it may concern:*

Be it known that I, NORBERT M. LA PORTE, a citizen of the United States of America, residing in the city of Baltimore, State of Maryland, have invented certain new and useful Improvements in Circulation Controls, of which the following is a specification.

The majority of internal combustion engines are provided with a jacket or chamber in the cylinder walls which is normally filled with water which is continually changed or circulated to prevent overheating of the cylinders. In automobile power plants, the water is passed through a radiator which is subject to a draft of air to achieve the necessary cooling. In the majority of stationary and marine installations, there is a sufficient supply of water at hand so that the content of the cooling system may be continually renewed and this is ordinarily done.

A large number of automobiles, principally those of the cheaper grades, are dependent for the circulation of cooling water on the thermosiphonic system. This is defective in that it is dependent for its effectiveness on the difference of temperature between the jacket and the radiator and thus gives the least cooling effect when there is the greatest need for cooling. In the stationary installations, in marine power plants and the more expensive automobiles, a mechanical pump is usually provided which is connected by means of suitable gearing to the engine shaft or otherwise driven at a speed which is proportionate to the speed of the engine. While this is probably more satisfactory than the thermosiphonic system, it is in turn defective because the heating effect is not always in proportion to the speed of the engine. In fact, the greatest amount of heat is produced when there is the greatest consumption of fuel, as in climbing hills, pulling through heavy sand and the like, but in these instances, the pump does not work as rapidly as it does when the car is running at high speed under low throttle and generating less heat, so that the temperature varies widely from the point of greatest efficiency which is constant.

The heat generated in a gasolene engine is necessarily proportionate to the fuel consumption and hence to the throttle opening, and therefore to prevent overheating and maintain a constant temperature near that of greatest efficiency, it is necessary to provide a cooling effect likewise proportionate to the throttle opening, and this is the object of my invention.

To this end, I provide, in connection with a constantly driven circulating pump, means for controlling the circulation of the cooling water to keep it directly proportionate to the throttle opening. More particularly, the device consists of a valve in the cooling system, the same being connected to the throttle valve to move therewith and control one of the main passages in the circulating system so it varies with and corresponds in area to the throttle opening. In this way the flow of water through the circulating system is controlled and varied according to the throttle opening.

In addition to the regulating valve, I also provide, in one form of my invention, a by-pass leading from the top to the bottom connection or from the inlet to the outlet of the water jacket, the controlling valve being at a point where the by-pass joins the bottom pipe leading to the jacket and so arranged that the path of circulation is always open through the jacket and back either by way of the radiator or through the by-pass but beyond minimum openings of the throttle, the circulation through the radiator is substantially proportionate to the throttle opening.

Where the by-pass is not used, a regulator valve is provided with a check corresponding to the usual throttle check so that it cannot be completely closed and there is always a path open for circulation, the area of the path corresponding to the area of the throttle.

An internal combustion engine and circulating system arranged in accordance with my invention is illustrated in the accompanying drawings, in which—

Figure 1 is a side elevation showing the engine, radiator, connections, and the circulator control constructed in accordance with the first form of my invention;

Fig. 2 is a similar device showing a second form of the invention;

Figure 3:
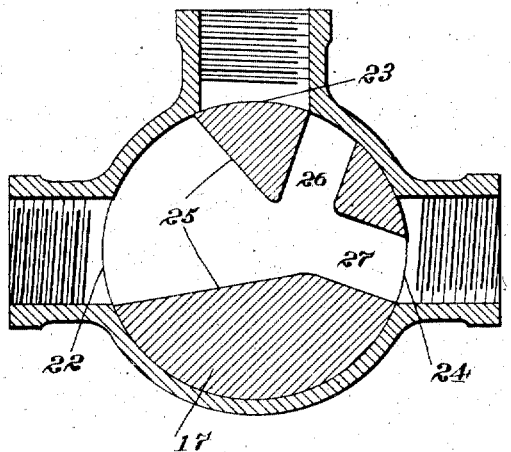
Figs. 3 and 4 show a three-way valve for connecting the by-pass.

Referring to the drawings by numerals, the installations shown in Figs. 1 and 2 consist of the usual cylinder castings 1, radiator 2, water jackets 3, connections 4 and 5, a circulating pump 6, and carbureter 7.

Referring now particularly to Fig. 1, there is a throttle valve 9 shown in dotted lines in the form of a balanced butterfly valve and at 10 in the bottom radiator connection, there is a control valve also in the form of a balanced butterfly valve. These valves are mounted on a transverse central point and rigidly connected to a lever arm 8 on the throttle valve and 11 on the control valve and these lever arms are joined by a connecting rod indicated at 12, or by other suitable means.

To provide for adjustment, there is a turn buckle 13 at an intermediate point on the rod or elsewhere, and to prevent complete closing of the valve 10, I provide an adjustable stop 14 similar to the stop 15 which serves a like office in connection with the throttle valve.

The manner of operation of the device illustrated in Fig. 1 will be easily understood from the description and preamble. In starting and idling on low throttle, both the throttle and the control valve are open to a slight degree and the circulation corresponds to the heat generated. As the throttle is opened in gaining headway and the amount of fuel increased, the control valve in the circulation is correspondingly opened and the cooling effect increased to correspond to the increase of heat generated. Likewise, in hill climbing and driving over heavy roads at full throttle where excessive cooling is necessary, the control valve being connected to the throttle valve, approaches the full open position and the maximum circulation which is necessary at this time is provided. On the other hand, in running at high speed with comparatively low throttle and the maximum pump speed and the maximum degree of air cooling, the control valve takes a position which tends to check the circulation and prevent excess cooling which is apt to take place under these conditions owing to the high speed of the pump in proportion to the fuel consumed.

Referring now particularly to Fig. 2, in the device here illustrated, there is a by-pass 16 joining the top and bottom connections, and at the base of the by-pass, I have shown in the bottom connection 5, a three-way valve 17. This valve is actuated by means of a lever 18 shown connected by means of a rod 19 to the lever 8 of the throttle valve. The rod 19 is provided with means for adjustment as to its length in the form of a turn buckle 20.

Figure 4:
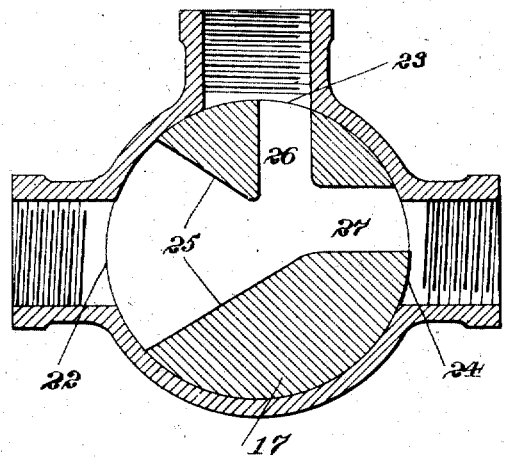
Figure 5:
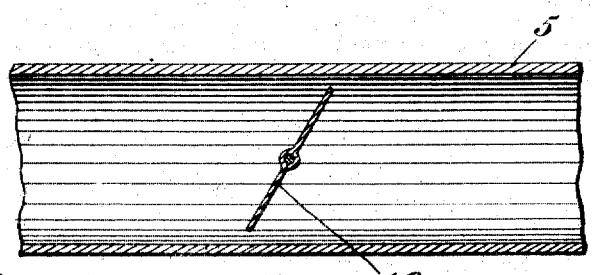
Fig. 5 shows a balanced butterfly valve for use without the by-pass.

Referring now to Figs. 3 and 4, the valve 17 which, as shown, is in the form of a plug valve, coöperates with three ports, 22, 23 and 24, corresponding 22 to the end of the bottom connection leading toward the water jacket, 23 to the lower end of the by-pass, and 24 to the bottom connection leading from the radiator. Coöperating with the ports 22, 23 and 24 are valve passages 25, 26 and 27. The first of these ports is of comparatively large dimension and is never closed during the normal operation of the system. The valve openings 26 and 27 are so arranged that as soon as one opening 26 passes out of registration with the port 23, the other opening 24 comes into registration with the port 24, and vice versa, so that circulation through the water jacket, either by way of the radiator or the by-pass, is always open, the water is always circulating when the engine is running and the circulation and hence the cooling effect is proportionate to the heat generated.

The operation of the second form has been fully described in the preamble and in connection with the description of the structure.

I have thus described specifically and in detail two forms of my invention in order that its nature and operation may be fully understood; however, the specific terms herein are used in their descriptive rather than in their limiting sense and the scope of the invention is defined in the claims.

I claim:

1. In combination in an internal combustion engine, a water jacket, a pipe leading to the water jacket, a pump for supplying cooling water, a throttle valve controlling the supply of fuel and air, a controller valve in the water supply and means connecting the throttle valve to the controller valve to give proportionate openings of the two valves whereby the water circulation is varied directly as the fuel supply.

2. In combination in an internal combustion engine, a throttle controlling the fuel supply, a water jacket, means for supplying water to the jacket and means for controlling the water supply, said means being connected to the throttle to regulate the water supply to correspond to the throttle opening.

3. In combination in an internal combustion engine, a water jacket, a radiator, a connection between the water jacket and radiator, a circulating pump driven at a speed proportionate to the speed of the engine, a throttle controlling the fuel supply, a controller valve in the connection between the water jacket and the radiator, and means connecting the throttle valve and controller valve causing them to operate together and regulating the circulation to correspond to the throttle opening.

4. In combination in an internal combustion engine, a water jacket, a radiator, top and bottom connections between the water jacket and radiator, a circulating pump driven at a speed proportionate to the speed of the engine, a throttle controlling the supply of fuel to the engine, a controller valve in the bottom connection between the water jacket and the radiator, and means connecting the throttle valve and controller valve to regulate the circulation to correspond to the throttle opening.

5. In combination in an internal combustion engine, a water jacket, a radiator, top and bottom connections between the water jacket and radiator, a circulating pump driven at a speed proportionate to the speed of the engine, a by-pass leading from the top to the bottom connection, a three-way valve in the junction of the bottom connection with the by-pass, the ports of the valves controlling the passages to the water jacket, to the by-pass and from the radiator respectively, a throttle valve controlling the supply of fuel to the engine and means connecting the throttle valve to the three-way valve to cause them to operate together and control the circulation to correspond directly to the throttle opening.

6. In combination in an internal combustion engine, a water jacket, a radiator, top and bottom connections between the water jacket and radiator, a circulating pump driven at a speed proportionate to the speed of the engine, a by-pass joining the top and bottom connections, a three-way valve in the junction between the by-pass and one connection, the ports of the three-way valve controlling the passages to the jacket, to the by-pass and to the radiator respectively, the passage to the jacket being open in all normal positions of the valve and the other two ports being arranged so that the passage to the radiator is opened when the by-pass is closed and vice versa, a throttle valve controlling the supply of fuel to the engine and means connecting the throttle valve to the three-way valve to control the circulation and keep the flow of water proportionate to the throttle opening.

7. In combination in an internal combustion engine, a water jacket, a radiator, top and bottom connections from the radiator to the water jacket, a water circulating pump, a by-pass between the top and bottom connections, a three-way valve at the juncture of the by-pass with one of said connections, a throttle controlling the supply of fuel to the engine and means connecting the three-way valve to the throttle whereby the cooling action is made proportionate to the heat generated.

Signed by me at Baltimore, Maryland, this 9th day of August, 1915.

NORBERT M. LA PORTE.

Witnesses:
  EDWARD L. BASH,
  EDWIN F. SAMUELS.